July 25, 1944. N. D. GRISWOLD 2,354,634
MIXING APPARATUS
Filed Feb. 4, 1942 2 Sheets-Sheet 1
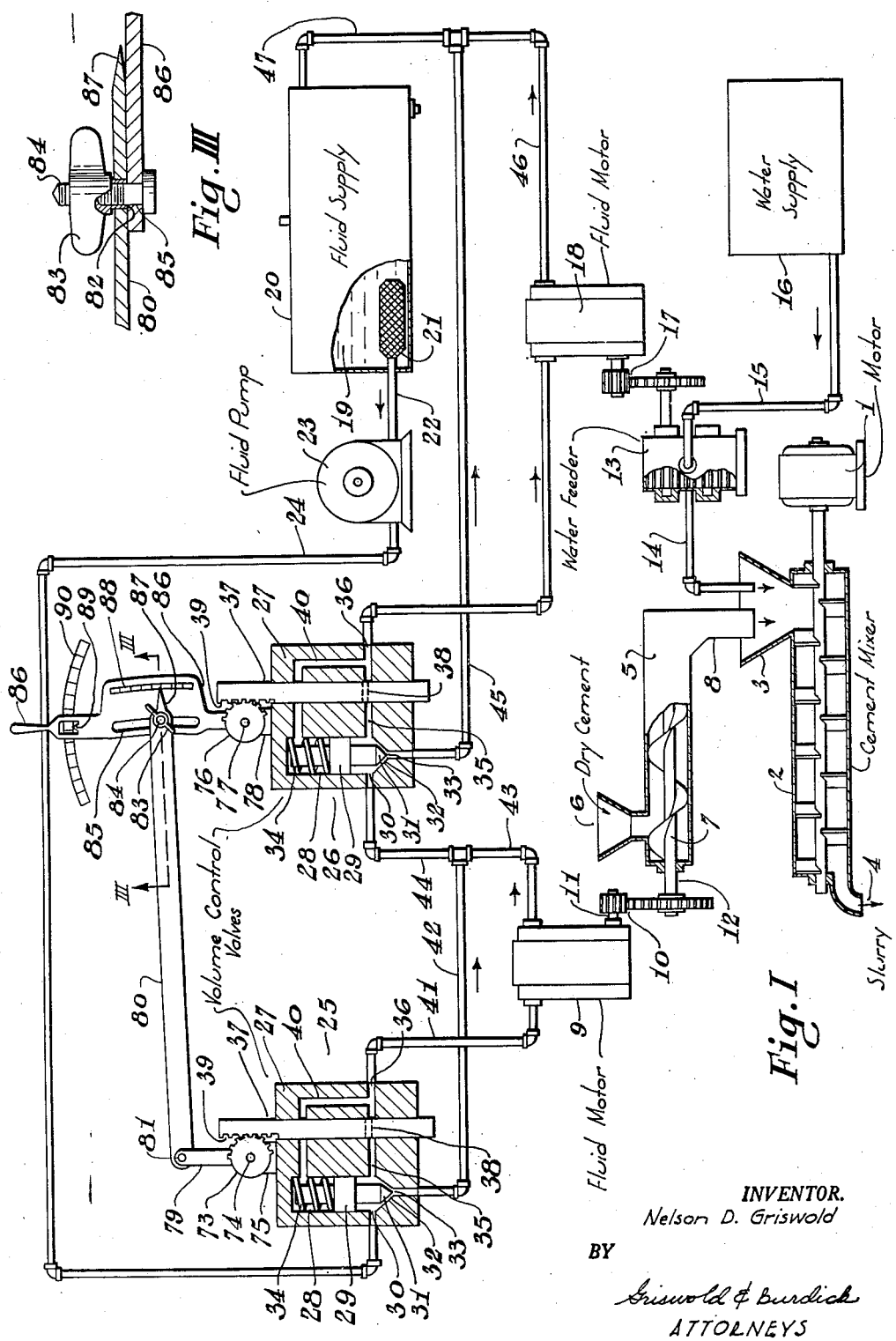
INVENTOR.
Nelson D. Griswold
BY
Griswold & Burdick
ATTORNEYS

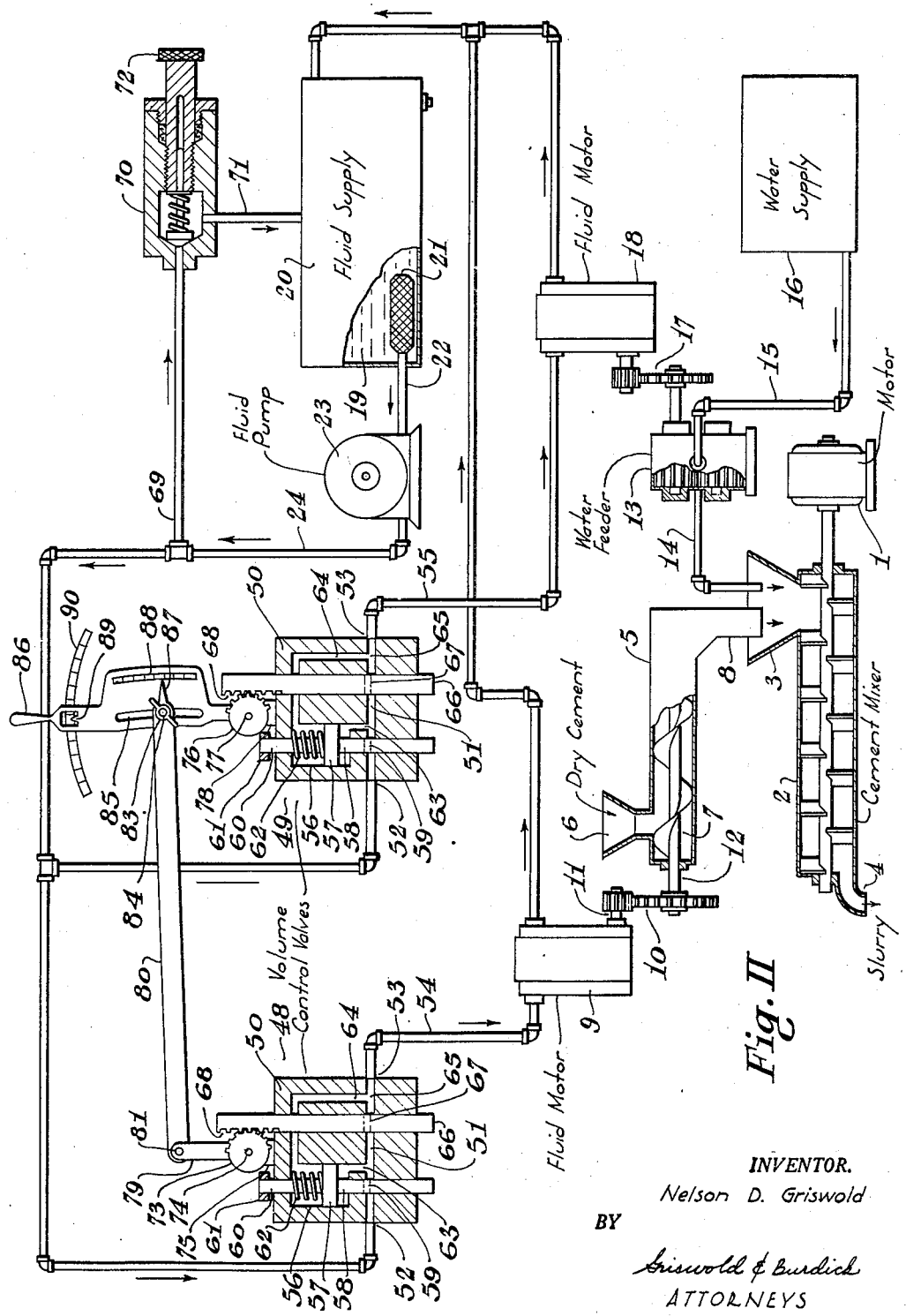
Fig. II

Patented July 25, 1944

2,354,634

UNITED STATES PATENT OFFICE 2,354,634

MIXING APPARATUS

Nelson D. Griswold, Freeport, Tex., assignor to
The Dow Chemical Company, Midland, Mich.,
a corporation of Michigan Application February 4, 1942, Serial No. 429,457

6 Claims. (Cl. 222—134)

The invention relates to a method of and means for forming cement slurries, especially those adapted for use in deep well cementing operations. It more particularly concerns a method of and apparatus for forming cement slurries in a continuous manner and at an adjustable rate while the ratio of the amount of cement to that of water in the slurry automatically remains at a preselected value also adjustable over a limited range, both adjustments being made readily and at the will of the operator.

In the invention there is employed a mixer for forming a cement slurry of water and powdered cement (the addition of other ingredients not being precluded) both the cement and the water being fed into the mixer by positive displacement feeders individually driven by fluid actuated motors whose driving rates, and therefore the delivery rate of each of the feeders, are proportional to the rate of flow of actuating fluid supplied to them. The flow of actuating fluid to the driving motors passes through a pair of flow control valves, provided with a special control linkage mechanism unifying the control of the flow of actuating fluid received by the driving motors of the feeders. It is a feature of the invention that by means of the movement of a single control lever, the rate of production or delivery of cement slurry is subject to instant control and variation within the limits of the apparatus, while the ratio of the amount of cement to that of water in the slurry automatically maintains itself at a preselected value, which is also subject to immediate variation and control at the will of the operator.

One of the objects of the invention is to provide a method of and means for forming a cement slurry at a rate which is under the immediate control of the operator and which rate can be varied while preserving a selected ratio of water to cement in the slurry.

Another object is to provide a method of and means for forming a cement slurry wherein the ratio of the amount of cement to that of water may be readily adjusted, as well as the rate of production of the slurry.

Another object of the invention is to provide means for producing a cement slurry at a rate which is adjustable while the ratio of water to cement automatically maintains itself at a predetermined value.

Other objects and advantages will become apparent from the following description taken in connection with the accompanying drawings.

In said accompanying drawings:

Fig. 1 is a schematic diagram showing an embodiment of my invention, in which the unifying control mechanism is linked to a pair of actuating fluid flow control valves of a by-passing type arranged for series flow of actuating fluid therethrough.

Fig. 2 is a schematic diagram showing another embodiment of my invention, in which the unifying control mechanism is linked to a pair of actuating fluid flow control valves of a balanced pressure type arranged for parallel flow of actuating fluid therethrough.

Fig. 3 is a sectional view taken on lines III—III of Fig. 1 showing a portion of the unifying control mechanism.

Similar reference numerals designate like or corresponding parts in all the figures of the drawings.

Referring to Figs. 1 and 2, alike except for the fluid flow control valves and their pipe connections to be separately described later, there is shown a motor 1 for driving a cement mixer 2, provided with a feed hopper 3 and finished cement slurry discharge passage 4. Dry cement powder is fed to the feed hopper 3 from the rotary cement feeder 5, which may be of any positive displacement type, such as the screw conveyor shown or other type, such that its rate of feed of dry cement to the mixer is very nearly proportional to the rate at which the feeder is driven. As shown, the cement feeder 5 comprises feed hopper 6 having a screw conveyor 7, which delivers cement through the outlet 8 to the feed hopper 3 of the cement mixer 2 at a rate which is nearly proportional to the rate of rotation of the screw conveyor 7. The screw conveyor 7 is driven by a fluid actuated rotary motor 9 through the gear train 10, which connects the power shaft 11 of the fluid actuated motor 9 with the screw conveyor driving shaft 12, the fluid motor being of the type having a rate of rotation directly proportional to the rate of flow of actuating fluid supplied thereto. Water is fed into the hopper 3 of the cement mixer 2 from water feeder 13, which may be any positive displacement type, the example shown being a gear pump having a discharge pipe 14 leading to the cement mixer, and a water supply pipe 15 connected to a water supply tank or other water source 16. The water feeder 13 is driven through gearing 17 by the fluid actuated rotary motor 18, whose rate of rotation is directly proportional to the rate of flow of actuating fluid supplied thereto. A supply of actuating fluid 19 is contained in tank 20 which is provided with a screened outlet 21 connected by pipe 22 to the fluid pump 23, having a fluid discharge line 24 delivering actuating fluid under pressure to the flow control valves connected thereto which valves control the rate of flow of fluid to fluid actuated motors 9 and 18.

In the embodiment of the invention shown in Fig. 1, the said flow control valves designated by numerals 25 and 26, shown in sectional elevation, are of the constant volume by-pass type operating in series, i. e., the actuating fluid is first directed through one valve and thereafter through the other valve. As shown, valve 25 controls the rate of flow of actuating fluid to the cement feeder motor 9, and valve 26 controls the rate of flow of actuating fluid to the water feeder motor 18.

Both valves 25 and 26 are alike and like parts are designated by the same reference numerals. As shown each valve is provided with a valve body 27. Formed within each body 27 is a cylindrical chamber 28 in which piston 29 is adapted to reciprocate. Discharge pipe 24 from the fluid pump 23 communicates with the cylindrical chamber below piston 29 through the valve inlet port 30 in the wall of the valve body 27. Attached to the lower portion of the piston 29 in either valve is a by-pass valve closure member 31 adapted to rest upon tapered valve seat 32, thus closing the fluid by-pass passage 33 communicating with the cylindrical chamber 28 below the piston. A compression spring 34 located in the cylindrical chamber 28 above the piston 29 in each valve exerts a pressure upon the piston tending to hold the by-pass valve closure member 31 on the valve seat 32. A fluid discharge passage 35 extends horizontally through each valve body and communicates with the cylindrical chamber 28 below the piston 29 as well as the outlet port 36. Flow of fluid through the passage 35 in each valve is subject to control by a flow control member 37, traversing passage 35 and having a port 38 adapted to register on longitudinal movement with a passage 35, said member closing the passage 35 to fluid flow when port 38 is not in registry therewith. The upper end of flow control member 37 of each valve projects beyond the valve body 27 and is provided with means, shown as a rack 39, for engaging means, to be later described, to impart longitudinal movement thereto for adjusting the registration of the port 38 with the fluid passage 35, thereby regulating the rate of flow of fluid therethrough. Both valves 25 and 26 are provided with a passage 40 which may be formed within the valve body 27 as shown and serves to connect the space in the cylindrical chamber 28 above the piston 29 with the fluid discharge passage 35 at a point between the flow control member 37 and the outlet port 36. This passage acts to equalize the fluid pressure in the cylindrical chamber above the piston with that in the discharge passage beyond the flow control member 37.

As further shown in Fig. 1 the actuating fluid from the pump 23 first flows through flow control valve 25. A portion of the fluid is directed to the cement feeder fluid driven motor 9 through pipe 41 connecting the valve outlet port 36 of valve 25 with motor 9. A second portion of the fluid reaching the flow control valve 25 flows through the by-pass port 33 connected by a by-pass pipe 42 to the discharge pipe 43 leading from motor 9. The combined flow of pipes 42 and 43 is carried by pipe 44 to the inlet port 30 of the second flow control valve 26. As in valve 25 a portion of the fluid flows through the valve and is directed through a suitable pipe to the fluid driven motor 18 driving the water feeder. The second portion of fluid flows through port 33 of valve 26 connected by pipe 45 to the discharge pipe 46 of the water feeder motor 18 and their combined flow is carried by pipe 47 back to the fluid supply tank 20.

In the embodiment of the invention, shown in Fig. 2, the flow control valves shown in sectional elevation as 48 and 49 are of the balanced pressure type operating in parallel. As shown valve 48 controls the rate of flow of actuating fluid to the cement feeder motor 9, and valve 49 controls the rate of flow of actuating fluid to the water feeder motor 18. Both valves 48 and 49 are alike and like parts are designated by corresponding numerals. In this type of valve, the rate of delivery is independent of the pressure developed by the fluid at the discharge side of the valve. Each valve comprises a valve body 50 having a through passage 51. An inlet 52 connects the fluid pump discharge pipe 24 with the flow passage 51. Valve 48 is provided with an outlet 53 which is in turn connected to pipe 54 leading to cement feeder motor 9 while outlet 53 of valve 49 is connected by pipe 55 to the water feeder motor 18. Each valve body 50 is also provided with a cylindrical chamber 56 in which piston 57 is adapted to reciprocate. Attached to the piston 57 is a valve rod member 58 having a port 59 adapted on longitudinal movement to register with the passage 51, said member closing the passage to fluid flow when the port is not in registry therewith.

Attached to the upper side of each piston 57 is a guide rod 60 extending through the valve body 50 provided with a stop 61 at the upper end which limits the downward travel of the valve rod members 58 to a point assuming full registry of the ports 59 with passages 51. Each valve is provided with a compression spring 62 mounted on guide rods 60 in the chambers 56 above the pistons 57 which longitudinally moves the valve members 58 so that ports 59 register with the passages 51. The space in the chamber 56 below the pistons 57 is connected by a passage 63 to passage 51 in order that fluid pressure in the passage 51 may be transmitted to the underside of pistons 57.

The upper end of the chamber 56 above the pistons 57 is connected by a passage 64 to passage 51 at a point 65 adjacent the outlet 53. Traversing passage 51 between point 65 and passage 63 forming a closure therefor is a longitudinally movable flow control member 66 having a port 67 therethrough adapted to register with the passage 51. The upper end of the flow control member projects beyond the valve body 50 and is provided with means such as a rack 68 for engaging and imparting longitudinal movement thereto thereby adjusting the registration of the port 67 with the passage 51, thus regulating the rate of flow of fluid therethrough.

Referring to Fig. 2, pipe 24 from pump 23 is connected by pipe 69 to a spring actuated adjustable relief valve 70, the discharge of which is carried by pipe 71 back to the fluid supply tank 20. This valve has the function of maintaining a constant pressure in the pipe 24 acting to carry the actuating fluid so that valves 48 and 49 receive actuating fluid at constant pressure determined by the setting of the pressure adjusting knob 72 on valve 70.

Manual control and adjustment of the rate of production of cement slurry and the ratio of the amount of water to that of cement in the slurry is obtained by means of a unifying control mechanism, the several parts of which are shown in Fig. 1 as applied to the series arrangement of the by-pass type of flow control valves 25 and 26 and in Fig. 2 as applied to the parallel arrangement of the balanced pressure type of flow control valves 48 and 49. In both Fig. 1 and Fig. 2 the control mechanism is the same. Referring to either Figs. 1 or 2, the unifying control mechanism comprises a segment gear 73 pivoted at 74 on support 75. The support is attached to the valve bodies of flow control valves 25 and 48 of Figs. 1 and 2, respectively. A somewhat similar segment gear 76 is pivoted at 77 on support 78 of valves 26 and 49. The support 78 is attached to the valve bodies of the flow control valves 26 and 49. The segment gears mesh with racks 39 and 68 and afford a means whereby the flow through the valves can be controlled. Rigidly attached to segment gear 73 of valves 25 and 48 is lever arm 79 on which one end of the link arm 80 is pivoted at 81.

The other end of link arm 80 is pivotally mounted on shoulder 82 provided on locking nut 83 as shown in detail in Fig. 3. A bolt 84 extends through a slot 85 in the face of lever arm 86, the latter being rigidly attached to segment gear 76. Thus slot 85 is in the form of a segment of an arc having link arm 80 as a radius. The link 80 comes to a point at the end to form an indicator 87 adapted to register with a scale 88 formed on the face of lever arm 86 about slot 85. As shown in the detail in Fig. 3 the shoulder 82 of locking nut engages the face of the lever arm 86 at each edge of the slot 85 as the nut 83 is tightened. This allows the link arm 80 to be moved up or down to the full extent of the slot 85 when the nut 83 is loose or to be locked in a desired position when the nut is tightened.

The operation of the apparatus embodied in Fig. 1 of the drawings will be best understood from the following description wherein the apparatus is employed to produce a neat cement slurry by intimately mixing cement powder and water. The pump 23 supplying fluid to the fluid driven motors 9 and 18 is started and at the same time cement powder is introduced into hopper 6 of the cement feeder. The motors 9 and 18 act to actuate the cement feeder and water feeder thus supplying water and cement powder to the cement mixer 2 which brings about intimate mixing of the cement and water as the mixing paddles are caused to turn by motor 1. The amount of cement and water being forwarded, and thus the rate of production of slurry, is controlled by suitable movement of lever 86. For example, movement of the lever 86 toward the left slows down the rate of production of slurry since less fluid is forwarded to the positive displacement fluid driven motors 9 and 18 due to the fact that such movement of the lever 86 causes the segment gears 73 and 76 to rotate in a counterclockwise direction thus lifting the flow control member 37 of each valve 25 and 26 with the attendant closing of ports 38 in flow passages of valves 25 and 26. Similarly movement of the lever 86 to the right increases the flow of both water and cement powder to the mixer since such movement allows the ports 38 to more nearly register with the flow passages 35 of valves 25 and 26. Additionally, if it is desired at any time to change the rate of water to cement admitted to the mixing chamber the operator has only to adjust link arm 80 so that a specific opening of one valve gives more or less opening of the other and hence the desired ratio is obtained as may be indicated by the scale 88. The capacity of the valves 25 and 26 and the gearing of the flow control members 37 are coordinated with the fluid driven motors in such a manner that movement of the lever 86 in either direction does not disturb an established water-cement ratio.

Thus the rate of production of slurry as well as the ratio of water to cement in the slurry produced are very simply and readily controlled.

A prerequisite to the operation of valves 25 and 26 to insure a constant volume of fluid being delivered for any particular position of the flow control members 37, regardless of variations in the upstream and downstream pressures encountered in normal operation, is the maintenance of a flow in line 24 at a rate such as will insure a differential pressure existing across the port 38. Assuming such a condition is fulfilled the valves 25 and 26 operate in the following manner to deliver a constant volume. Fluid directed through line 24 to valve 25 enters the valve and flows through the port 38. The rate of flow of actuating fluid delivered from the outlet port 36 of either valve may, of course, be varied by changing the degree of registry of the port 38 with passage 35. The combination of the flow passage 35 and port 38 functions as an orifice, the size of which is subject to variation and control by the longitudinal movement of the flow control member 37. It is evident that for any given position of the flow control member 37 and hence the port 38 with respect to the passage 35 a certain size orifice is produced and this in turn allows a pressure differential to be maintained across the port 38 and, therefore, between the valve inlet port 30 and the outlet port 36. The pressure in the cylinder 28 below the piston 29 is equal to the line pressure in line 24, while the pressure in the chamber above the piston is equal to the downstream pressure below the valve plus the pressure corresponding to that produced by the compression spring 34 urging the piston 29 downward. The downward movement of the piston 29 moves the valve closure member 31 toward the valve seat 32 tending to close the by-pass 33. At any given setting of control member 37 any tendency for the rate of flow of the fluid driving the motors to change, caused by a reduction or increase in the load on either fluid motor 9 or 18 or by an increase or decrease in pressure in line 24, is automatically compensated for by the action of piston 29 coacting with by-pass closure member 31. For example, increasing the load on motors 9 or 18 causes an increase in the pressure in the pipes on the downstream side of the valves and this increase is immediately transmitted to the top of piston 29 causing the piston to move downwardly with the consequent throttling of flow through the by-pass outlet 33. This throttling causes an increase in pressure in the pipes on the upstream side of the valves until the upstream pressure acting against the bottom of piston 29 is balanced by the downstream pressure plus the pressure exerted by spring 34. In other words, the upstream pressure is always equal to the downstream pressure plus the pressure corresponding to that exerted by the spring as long as the member 31 is exerting a throttling effect at the by-pass 33. The overall effect of the spring-actuated piston 29 thus produces a constant differential pressure across the orifice formed by port 38 and flow passage 35 for any given setting of flow control member 37 and hence the delivery of a constant volume of fluid to each motor 9 or 18. In a similar manner a decrease in the line pressure on the downstream side of the valve or an increase or decrease in pressure on the upstream side of the valve causes the valve to balance so that the differential pressure across the orifice formed by the port 38 and flow passage 35 is constant. Thus fluid reaching either valve passes through the port 38 at constant differential pressure and hence a constant volume is delivered.

The operation of the embodiment shown in Fig. 2 is somewhat different from that shown in Fig. 1 in that the constant volume delivery valves operate in a different manner to insure the delivery of fluid to the fluid driven motors at a constant volume for any particular setting of the valves. In Fig. 2 the fluid is delivered to the valves 48 and 49 at a constant pressure due to the action of the adjustable relief valve 70. Thus the fluid pressure in line 24 remains substantially constant and is controllable to any desired value within the limits of the relief value. The fluid entering either valve 48 or 49 passes through ports 59 and 67 in flow passage 51. These ports positioned in longitudinally movable members 58 and 66 and cooperating with flow passage 51 act as a set of orifices in series. As fluid flows through either valve a pressure drop occurs across each orifice. The pressure drop across the orifice formed in each valve by port 67 and flow passage 51 is maintained constant by the action of the valves regardless of an increase or decrease in load on the motors 9 and 18. At all times as flow through the valve occurs pressure in the line on the downstream side of the valve transmitted to the top of piston 57 plus the pressure transmitted to the top of the piston due to spring 62 is equal to the pressure in flow passages 51 transmitted to the underside of the piston. Additionally, the pressure drop in pounds per square inch across the orifice formed by port 67 and flow passage 51 is equal to the pressure in pounds per square inch transmitted to the piston by spring 62. An increase in load on motor 9 causes an increase in pressure in line 54. This pressure is in turn transmitted to the top side of piston 57 and, since this piston is in balance, an increase in pressure depresses the piston and increases the amount of registry of port 59. This in turn decreases the pressure drop across port 59, thus permitting the pressure to build up in passage 51 until it again equals the pressure on the downstream side of the line plus the pressure transmitted by the spring. The overall effect is to thus keep the pressure differential constant between passage 51 and the valve outlet 53 and thus the flow is maintained at a constant volume. Similarly a decrease in load on the motors causes a decrease in the pressure on the downstream side of the valve which is balanced by the valve so that a constant volume of fluid is always delivered by the valve and thus the motors can only turn at a constant rate for any particular setting of the valves. The rate at which the slurry is produced can be varied by a movement of lever 86 so as to expose more or less area of ports 67 to the flow of fluid which in turn causes the motor delivering water and cement powder to turn at a faster or slower rate. It is also readily possible to vary the ratio of water to cement by changing the position of indicator 87 on scale 88 by adjusting nut 83 which causes one of the valves to open to a lesser or greater degree relative to the other producing the desired variation in the water to cement ratio.

The apparatus just described is especially adaptable for the production of neat cement slurries since it is possible to produce cement-water mixtures at widely varying rates having any practical water to cement ratio in a manner requiring the minimum of attention and manipulation without the necessity of employing the usual mechanical linkages consisting of elaborate gear systems.

I claim:

1. An apparatus for controlling the feed rate and proportions of cement and water delivered to a cement mixer, comprising the combination of a cement powder forwarding means and a water forwarding means, fluid driven motors adapted to actuate the cement powder and water forwarding means at a rate proportional to the flow of driving fluid supplied thereto, valves in the lines supplying the fluid to the motors adapted to deliver a constant volume of fluid to each motor for a specific setting of the valves regardless of variations in the downstream pressure adjacent to the valves, and means linking the opening and closing mechanism of said valves together so that opening and closing one valve opens and closes the other valve an amount such that the flow of fluid to the motors through the valves is proportional.

2. An apparatus for controlling the feed rate and proportions of cement and water delivered to a cement mixer comprising a cement powder forwarding means and a water forwarding means, fluid driven motors adapted to actuate the cement powder and water forwarding means at a rate proportional to the flow of driving fluid supplied thereto, valves in the lines supplying the fluid to the motors adapted to deliver a constant volume of fluid to each motor for a specific setting of the valves regardless of relatively large variations in the downstream pressure adjacent to the valves, and means linking the opening and closing mechanism of said valves together so that opening and closing one valve opens and closes the other valve an amount such that the ratio of cement powder to water being forward remains fixed.

3. An apparatus for controlling the feed rate and proportions of cement and water delivered to a cement mixer comprising positive displacement cement powder forwarding means and water forwarding means, fluid driven motors of the positive displacement type adapted to actuate the cement powder and water forwarding means at a rate proportional to the flow of driving fluid supplied thereto, valves in the lines supplying fluid to the cement powder and water forwarding means, said valves including means adapted to maintain a constant differential pressure across a restricted flow passage in the valves regardless of increases and decreases in the opening of the valves, and means linking the opening and closing mechanism of said valves together so that opening and closing one valve produces a proportional opening and closing of the other valve.

4. An apparatus for controlling the feed rate and proportions of cement and water delivered to a cement mixer comprising cement powder forwarding means and water forwarding means, fluid driven motors adapted to actuate the cement powder and water forwarding means at a rate proportional to the flow of driving fluid supplied thereto, valves in the lines supplying the fluid to the motors adapted to deliver a constant volume of fluid to each motor for a specific setting of the valves regardless of relatively large variations in the downstream pressure adjacent to the valves, means linking the opening and closing mechanism of said valves together so that opening and closing one valve opens and closes the other valve an amount such that the ratio of the cement to water being forwarded remains fixed, adjusting means associated with said linking mechanism whereby the linking mechanism may be set to permit more or less fluid to be directed through one valve relative to the other, and a relief valve in the line supplying the fluid to the first-mentioned valves adapted to maintain a constant pressure on the upstream side of said first-mentioned valves.

5. The apparatus of claim 1 wherein the valves are adapted to deliver a constant volume of fluid to each motor regardless of variations in the upstream and downstream pressures adjacent the valves.

6. The apparatus according to claim 1 wherein the means linking the opening and closing mechanism of said valves is adjustable to permit more or less fluid to be directed through one valve relative to the other.

NELSON D. GRISWOLD.